June 10, 1958  R. S. DEAN  2,838,393
PROCESS FOR PRODUCING TITANIUM AND ZIRCONIUM
Filed Nov. 23, 1954
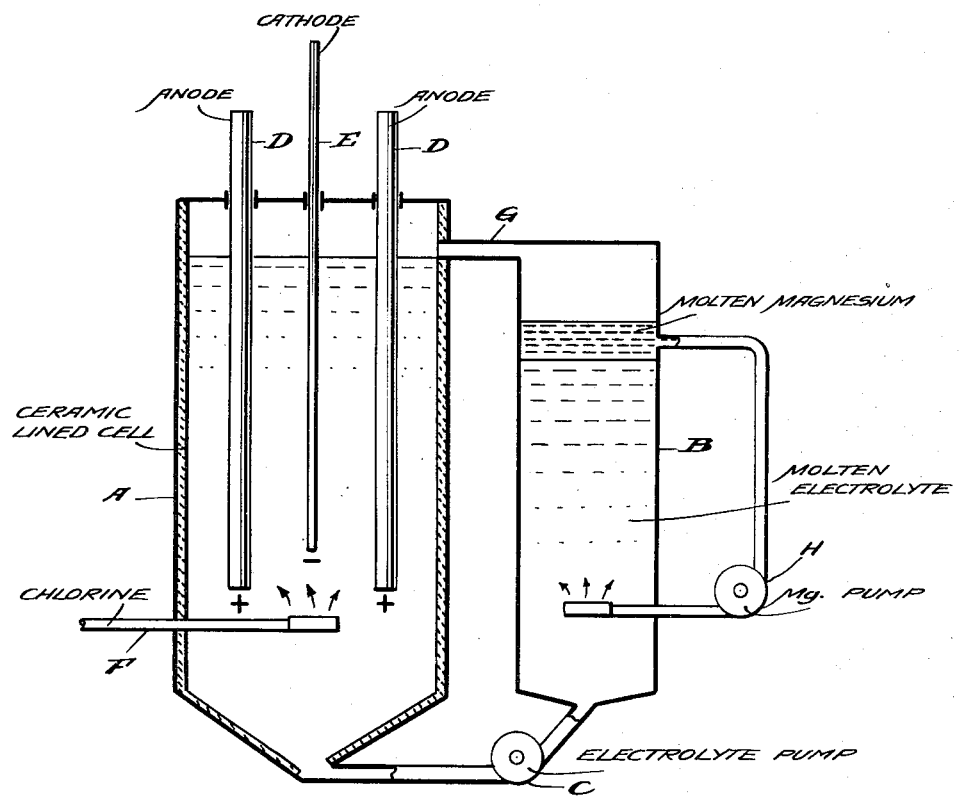
Reginald S. Dean
INVENTOR

2,838,393

PROCESS FOR PRODUCING TITANIUM AND ZIRCONIUM

Reginald S. Dean, Hyattsville, Md., assignor to Chicago Development Corporation, Riverdale, Md.

Application November 23, 1954, Serial No. 470,609

1 Claim. (Cl. 75—84.4)

This invention relates to the reduction of titanium and zirconium chlorides and bromides, and has for its object the production of substantially oxygen-free titanium and zirconium.

It has long been recognized by investigators in this field that the separation of oxygen from titanium and zirconium could be most effectively accomplished by converting these metals to their chlorides or bromides. Such chloride or bromide can be separated from the other reaction products in an oxygen-free form. Procedures for accomplishing this are known in the art and will be described herein only to illustrate their preferred embodiments which provide the initial material for the subsequent steps which constitute my invention.

The problem which my invention solves is one of long standing. The simplest titanium chloride to prepare and purify is the tetrachloride. The earliest efforts to produce oxygen-free titanium by reduction of a chloride or bromide naturally concerned themselves with this chloride. Reduction was achieved by Hunter as early as 1910 (J. Am. Chem. Soc. 32, page 332), by heating the tetrachloride in a bomb with an excess of sodium. Difficulty was encountered in purifying the resulting product because the reaction could not be completed and insoluble reaction products contaminated the titanium when the sodium chloride was separated by solution. The elimination of contaminants, particularly excess reducing metal, has remained a major problem, and has not been satisfactorily solved until the application of my invention.

To place my invention in proper perspective, some of the efforts of other investigators to solve the problem will be briefly described. Billy (Comptes Rendus (V) 158, page 518 (1914)), introduced hydrogen into the reduction to form titanium hydride, thereby to attain more nearly complete reduction and to produce titanium metal containing hydrogen which is less attacked by acid. The use of hydrogen in this way has also been employed by other investigators, most recently in 1951 by Cordner and Worner (Australian Journal of Applied Science 2, No. 3, September 1951), who reduced a lower chloride of titanium dissolved in a fused alkali chloride by electrolysis in the presence of hydrogen. This expedient has not been completely successful. The carrying out of the sodium reduction of the chloride in the presence of a large excess of fused sodium chloride whereby to separate the reduced titanium and sodium by gravity is described in British Patent No. 479,014 of January 28, 1938. This expedient, however, did not prevent the admixture of some sodium with the titanium.

The next approach to the problem of producing oxygen-free titanium was made by Kroll as described in U. S. Patent No. 2,205,854 of June 25, 1940. Kroll carried out the reaction with titanium tetrachloride and magnesium in such fashion that the tetrachloride came in direct contact only with the magnesium. The reaction products being heavier than the magnesium sank beneath the magnesium surface. In this way fairly complete reduction was accomplished without the formation of lower chlorides of titanium. Such a reaction mixture could be separated with less contamination than by previous methods. The product of the Kroll process still contained objectionable quantities of impurities.

British Patent No. 697,530 of September 23, 1953, proposed the solution of the problem by using potassium mixed with sodium. The product, however, contained only 99.5% titanium and was therefore not satisfactorily pure. British Patent No. 697,917 proposed to remove the excess metallic sodium by ammonia solution, thereby making possible the water solution of the sodium chloride without the contamination of the titanium metal caused by the presence of sodium hydroxide.

It is pointed out that the problem is present not only in the chemical reduction of titanium chlorides, but also in the electrolytic reduction. This is true because of the established nature of the incomplete reaction between the alkalinous metals and chlorides of titanium. The electrolyte in such instances must of course contain the equilibrium mixture of alkalinous metal liberated at the cathode and titanium chloride. It must be pointed out in this connection that the alkalinous metal which dissolves in the electrolyte, and is in equilibrium with the titanium chloride therein, does not have a discharge potential in the usual sense, but is formed along with titanium at the cathode. The result of this is the formation of loosely adherent and contaminated cathode deposits. Such cathode deposits have been formed in the electrolytic processes so far proposed for titanium production. I am aware that it has been proposed to ameliorate this condition by having more than one chloride of titanium present. I have found that this is only a temporary solution of the problem, and that even when chlorine is added it loses its effectiveness when the concentration of titanium chloride in the electrolyte increases.

I have found that the complete reduction of titanium chlorides by means of a metal selected from the group consisting of sodium, lithium, calcium, strontium, and barium, requires a minimum concentration of both reactants in a fused alkalinous chloride or bromide. I am not able to fully explain the mechanism. It is sufficient to say that the product of the concentrations of the two reactants is not a constant as is usually the case, but rather the constant is such that a minimum concentration of one reactant is associated with a minimum concentration of the other reactant.

This situation arises from the solubility of the listed metals in their fused chlorides and bromides. Such solubility is a recognized fact. However, the nature of the reaction between such dissolved metals and titanium chlorides has not been heretofore recognized. Particularly the chain reaction which is a necessary result of the reaction mechanism described has not been pointed out.

The attempts to obtain complete reaction by balancing the dissolved metal and the titanium chloride have only partially succeeded because even the slightest unbalance initiates a chain reaction whereby the concentration of both reactants increases to the point of saturation of one or the other reactant. It is therefore necessary, if the reaction of titanium chloride with a solution of one of the listed alkalinous metals in their fused chlorides or bromides is to be brought to complete reaction of both materials to form titanium metal, that both reactants be removed by auxiliary reactions. The essence of my invention is such removal of the reactants. I accomplish this by first removing the alkalinous metal by adding either chlorine or bromine or a higher chloride or bromide of titanium (or zirconium, as the case may be).

The fused salt is now free from alkalinous metal but contains titanium chloride. I remove this latter by reaction with a metal which is substantially insolutble in the molten alkalinous chloride or bromide. Magnesium is preferred for this purpose. It must be pointed out that since magnesium is insoluble in the bath, the reaction is a heterogeneous one. The entire salt bath must therefore be brought into contact with a magnesium surface. The bath must, accordingly, be circulated over or stirred with molten magnesium. As a result of the combination of steps described, the salt bath is rendered free of both dissolved alkalinous metal and titanium halides. The cycle of titanium reduction by maintaining low and equivalent concentrations of the reactants may be resumed. My invention applies to simple chemical processes and to electrolytic processes.

I am aware that mixtures of sodium and magnesium have been used for the chemical reduction of titanium chlorides. Such a procedure, however, does not accomplish the purpose of my invention, because the final reaction mixture will still contain dissolved sodium unless a higher chloride of titanium is added in excess under which conditions the final portion of the process will be the same as that suggested by Kroll, and in which the reaction will only proceed as long as free magnesium surface is exposed to the action of the titanium chloride.

The advantage of my invention lies in the utilization in so far as possible of the nearly complete reaction which takes place between a very dilute solution of an alkalinous metal and the equivalent amount of similarly dilute titanium chloride in a fused alkalinous halide. To do this I periodically reduce the concentration of both reactants in the manner set forth. Since the reactions of my process are applied only to the correction of an unavoidable but slight unbalance, the amount of reagent consumed in the use of my process will be small compared to the amounts of principal reagents consumed. For example, I have found it possible to add sodium and titanium tetrachloride to a fused sodium chloride bath at such controlled rates that less than 1 lb. of the sodium added remains in solution during the reaction of 100 lbs. of sodium introduced into 1000 lbs. of NaCl. At this point, however, the concentration of both sodium and titanium chloride is increasing rapidly, and I discontinue sodium addition until the sodium content of the electrolyte reaches a very low figure. I then add magnesium to reduce the remaining lower titanium chloride. The magnesium used for this purpose is less than 1 lb. so that the amount of magnesium used is a very small fraction of the sodium used.

In the case of a reaction carried out in an electrolytic cell the equivalence of the alkalinous metal formed at the cathode and the titanium dissolved at the anode may be even more closely controlled. My process must, however, be applied periodically to prevent the reduction reaction wandering from the cathode.

It will be evident from this discussion, however, that my process consists of auxiliary reactions used to control the major reduction of titanium chlorides with alkalinous metals, soluble in their fused chlorides and bromides, such as Na, Li, Ca, Sr and Ba.

I have described my invention in its application to titanium. This has been for the sake of brevity. My invention applies equally to zirconium. The only difference is a mechanical one arising from the fact that $ZrCl_4$ is a solid which sublimes whereas $TiCl_4$ is a liquid. This difference, however, in no way affects the steps of my invention.

Having now described my invention in general terms, I will illustrate it by examples which must be understood to be merely illustrative of, and not limitative with respect to, the invention.

*Example I*

I take 100 lbs. of sodium chloride and melt it in a covered iron pot provided with an argon atmosphere. I add molten sodium under the surface of the melt near one side of the pot and $TiCl_4$ is led in on the other side of the pot. The rate of addition is at the rate of 4 gram atomic weights of sodium and 1 gram molecular weight of $TiCl_4$. The reaction is carried on at 850° C. until 10 lbs. of sodium has been added. I then discontinue the addition of sodium and continue the addition of $TiCl_4$ until the melt contains no sodium metal. The melt at this point contains about 0.1 lb. titanium as chloride. I now add magnesium under the surface of the melt in an amount equivalent to 0.1 lb. titanium as $TiCl_3$. I now solidify the melt and find that the salt may be dissolved away from the titanium without contaminating the latter. The titanium so recovered analyzes less than .05% oxygen.

*Example II*

I set up an electrolytic cell with a titanium anode and a titanium cathode in an electrolyte of an eutectic mixture of $LiCl+KCl$ with 0.1% by weight of $TiCl_2$. The cell is provided with a cover and with an atmosphere of argon. Electrolysis is conducted by passing a unidirectional current of 100 amperes at a current density of 200 amps./sq. ft. After 30 minutes about 50 g. of titanium have been deposited on the cathode and the $TiCl_2$ content of the electrolyte has increased to 1% by weight. I now add 0.2% by weight of chlorine to the electrolyte and then 0.5% by weight magnesium, the electrolysis being continued. I repeat this every 30 minutes and find that 1000 grams of titanium may be deposited on the cathode in dense coherent form.

*Example III*

In this example I set up an electrolytic cell as in Example II except that the anode is a bar of zirconium and the cathode is a steel strip which it is desired to plate with zirconium. The cell is provided with an inlet at the bottom and an overflow into a second compartment at the top. This is illustrated in the figure. In addition to the two compartments A and B in the figure the cell has a pump C to circulate the electrolyte through the cell. The anode is shown at D and the cathode at E. An inlet is provided in the plating compartment of the cell for chlorine shown at F and an inlet for magnesium is provided in the other compartment and an overflow for magnesium G. A pump H is provided for the circulation of magnesium. With a cell arranged in this way a unidirectional current is passed from anode to cathode. Zirconium dissolves at the anode as $ZrCl_2$ and is slightly oxidized by chlorine to $ZrCl_3$.

Plating takes place from the mixture but the zirconium chloride in the electrolyte increases. The pump which circulates the electrolyte and the pump which circulates the magnesium are now started. The circulation of magnesium is maintained at a rate so that chlorine is removed from the electrolyte in exactly the amount added. The amount of chlorine added is one-tenth of that which corresponds to the zirconium plated calculated as $ZrCl_2$.

By proceeding according to this example thick plates of zirconium may be made.

*Example IV*

I proceed as in Example III except that the overflow from the cell is discarded and new electrolyte added into the second compartment.

I claim:

Process of reducing substantially completely to metal a lower halide of a first metal selected from the group consisting of zirconium and titanium, said halide being selected from the group consisting of chlorides and bromides, dissolved in a fused salt of at least one halide selected from the group consisting of chlorides and bromides of sodium, lithium, calcium, strontium and barium, by means of a solution, in said fused salt free from discrete metal, of a second metal selected from the group consisting of sodium, lithium, calcium, barium and strontium, whereby to form a reaction mixture of dissolved second group metal, precipitated first group metal and lower halide of the first group metal, characterized by at least one cycle of the steps consisting essentially in: first removing dissolved second metal from the reaction mixture by reacting the latter with substantially the stoichiometric equivalent of a halogenating agent selected from the group consisting of chlorine, bromine, a tetrachloride of said first metal and a tetrabromide of said first metal, thereby converting the dissolved second metal to the halide salt thereof, and then removing residual halide of first metal, in solution in the resulting reaction mixture, by adding to the resulting reaction mixture magnesium in an amount stoichiometrically equivalent only to said dissolved residual halide thereby converting said residual halide to first metal and halide of magnesium.

References Cited in the file of this patent
UNITED STATES PATENTS 2,205,854    Kroll _____ June 25, 1940

FOREIGN PATENTS 152,033    Australia _____ June 24, 1953
1,064,893    France _____ Dec. 30, 1953

OTHER REFERENCES

Cordner et al.: "Australian Journal of Applied Science," vol. 2, No. 3 September 1951, pages 358–367.

U. S. Bureau of Mines Report of Investigation RI 4915, November 1952, pages 17–21 (Kroll et al.).